US008024933B2

(12) United States Patent
Woolford et al.

(10) Patent No.: US 8,024,933 B2
(45) Date of Patent: Sep. 27, 2011

(54) WALL ELEMENTS FOR GAS TURBINE ENGINE COMBUSTORS

(75) Inventors: James R Woolford, Bristol (GB); Stephen J Mills, Ashbourne (GB); Kevin A White, Derby (GB)

(73) Assignee: Rolls-Royce plc, London (GB)

( * ) Notice: Subject to any disclaimer, the term of this patent is extended or adjusted under 35 U.S.C. 154(b) by 919 days.

(21) Appl. No.: 11/650,432

(22) Filed: Jan. 8, 2007

(65) Prior Publication Data
US 2010/0229563 A1  Sep. 16, 2010

(30) Foreign Application Priority Data

Jan. 25, 2006 (GB) .................................. 0601418.7

(51) Int. Cl.
*F02C 1/00* (2006.01)
(52) U.S. Cl. ................. 60/755; 60/752; 60/758
(58) Field of Classification Search ............. 60/752–760
See application file for complete search history.

(56) References Cited

U.S. PATENT DOCUMENTS

| 3,608,310 | A | * | 9/1971 | Vaught ............................ 60/752 |
| 4,064,300 | A | | 12/1977 | Bhangu |
| 4,446,693 | A | * | 5/1984 | Pidcock et al. ................. 60/800 |
| 5,259,182 | A | * | 11/1993 | Iwai et al. ........................ 60/777 |
| 6,408,628 | B1 | * | 6/2002 | Pidcock et al. ................. 60/752 |
| 6,708,499 | B2 | * | 3/2004 | Pidcock et al. ................. 60/796 |
| 7,694,522 | B2 | * | 4/2010 | Nakae et al. .................... 60/752 |
| 2003/0056516 | A1 | | 3/2003 | Hadder |
| 2004/0083739 | A1 | | 5/2004 | Pidcock |
| 2006/0016582 | A1 | * | 1/2006 | Hashimoto et al. ........ 165/109.1 |

FOREIGN PATENT DOCUMENTS

| GB | 0762596 | 11/1956 |
| GB | 1 079 186 | 8/1967 |
| GB | 1079186 | 8/1967 |
| GB | 1 197 197 | 7/1970 |
| GB | 2125950 A | 3/1984 |
| GB | 2356042 A | 5/2001 |
| JP | 2003130354 A | 5/2003 |

* cited by examiner

*Primary Examiner* — Ehud Gartenberg
*Assistant Examiner* — Young Choi
(74) *Attorney, Agent, or Firm* — Jeffrey S. Melcher; Manelli Selter PLLC

(57) ABSTRACT

The invention relates to a wall element for a wall structure of a gas turbine engine combustor. The wall element has an inner, in use, hot surface, and an outer, in use, cooler surface. A plurality of projections is provided on the outer surface to facilitate heat transfer to a coolant flow. The wall element comprises a means to direct more coolant flow at a hot-spot on an adjacent tile than the remainder of the adjacent tile and thereby reducing the thermal gradient across the adjacent tile.

15 Claims, 4 Drawing Sheets

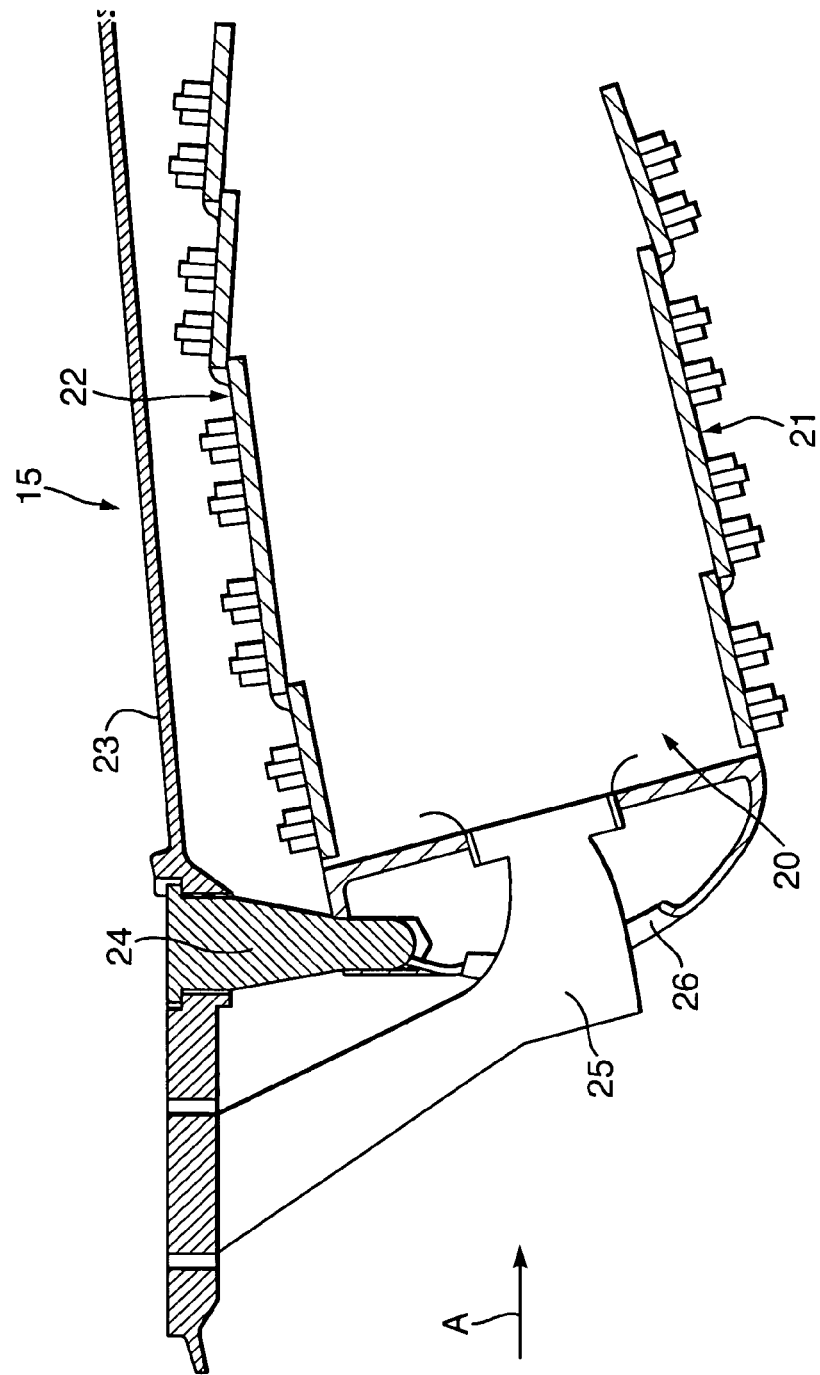

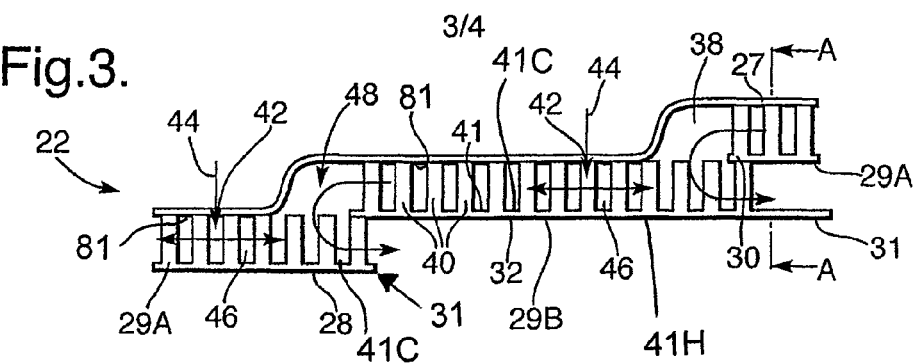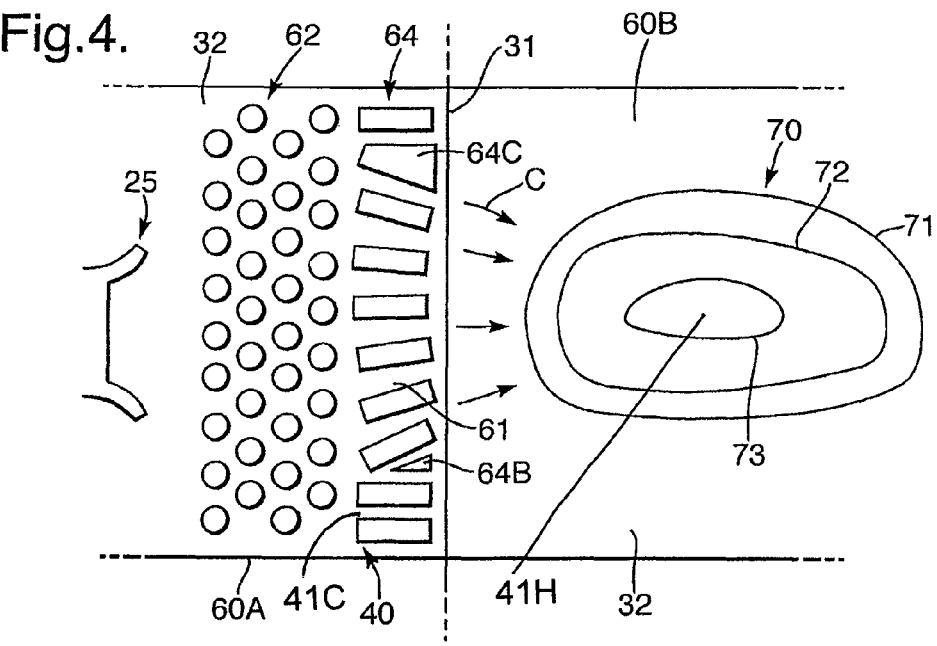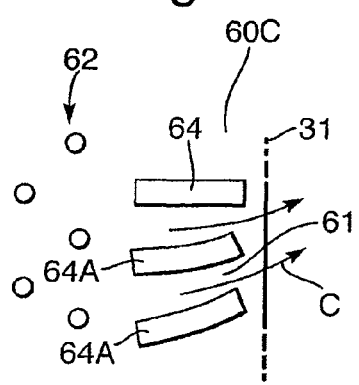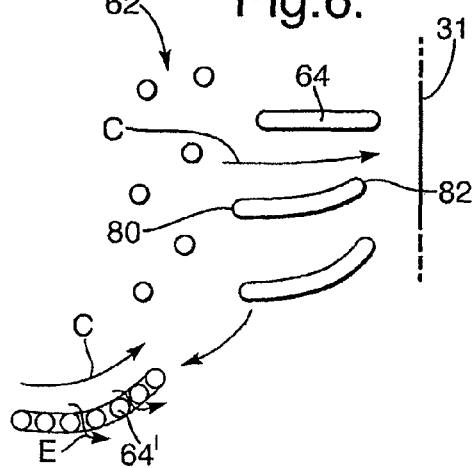

WALL ELEMENTS FOR GAS TURBINE ENGINE COMBUSTORS

CROSS-REFERENCE TO RELATED APPLICATIONS

This application which claims priority to GB 0601418.7, filed 25 Jan. 2006.

BACKGROUND OF THE INVENTION

This invention relates to combustors for gas turbine engines, and in particular to wall elements for use in wall structures of combustors of gas turbine engines.

It is known to construct combustors of gas turbine engines with radially inner and outer double-walls, each having an external wall and an internal wall, the internal wall being formed of a plurality of tiles or other similar wall elements. Air is passed between the internal and external walls to provide cooling. Some of this air passes onto the hot side of the internal walls through effusion cooling holes to form a film of cooling air thereover.

The tiles typically overlap, often with a relatively cooler side of an upstream tile overlapping a hotter side of a downstream tile. This means that cooling air from the cooler side of the upstream tile can pass onto the hotter side of the downstream tile. Some air will also normally pass around the edge of a tile from the cooler side to the hotter side thereof.

Projections such as pedestals are generally provided on the rear of the tiles, extending toward the outer wall, to provide heat transfer. Cooling of the tiles therefore takes place on the cooler side by convection from the projections, and on the hotter side by film cooling. The pedestals are typically arranged in staggered rows to maximise heat transfer. In a prior art tile the array of pedestals are of uniform size and are arranged in a uniform pitch and spacing. For tiles that experience hot spots, such as those immediately downstream of a fuel injector, this arrangement is sufficient to cool the tile, however, there remains a significant thermal gradient across the tile. The thermal gradient gives rise to differential thermal expansions and contractions and consequently internal differential thermal stresses. Such differential thermal stresses, during engine flight cycles, cause thermal fatigue in the tile material and limits the service life of the tile.

The object of the present invention is therefore to maintain a more constant temperature throughout a tile and across the surface of the tile and therefore reduce the thermal gradient thereby increasing the life of the tile.

SUMMARY OF THE INVENTION

According to the invention, there is provided a wall element for a wall structure of a gas turbine engine combustor, the wall element having an inner, in use, hot surface, and an outer, in use, cooler surface; a plurality of projections being provided on the outer surface to facilitate heat transfer to a coolant flow, characterised in that the wall element comprises a means to direct more coolant flow at a hot-spot on an adjacent tile than the remainder of the adjacent tile and thereby reducing the thermal gradient across the adjacent tile.

Preferably, the projections are arranged in a first pattern, the first pattern comprising a staggered array of projections.

Preferably, the means to direct coolant flow is adjacent an edge of the wall element, the means comprises projections arranged in a second pattern, the projections in the second pattern are configured to direct more cooling flow at the hot-spot than the remainder of the adjacent tile.

Preferably, at least some of the projections in the second pattern are elongate with respect to the direction of cooling flow. Preferably, the elongate projections comprise a leading tip and a trailing tip, at least one of the tips having an aerodynamic profile.

Alternatively, at least some of the projections in the second pattern comprise a plurality of discrete pedestals. Preferably, a space between adjacent pedestals, within the plurality of discrete pedestals, is less than the corresponding dimension of either adjacent pedestal.

Preferably, the projections in the second pattern are angled towards the hot-spot.

Alternatively, at least two of the projections in the second pattern are arranged at different angles.

Alternatively, the projections in the second pattern are curved and turn the cooling flow towards the hot-spot.

Alternatively, at least two of the projections in the second pattern are arranged with different curvatures.

Alternatively, passages defined between projections, adjacent the hot spot have a greater cross-sectional areas than those not adjacent the hot spot.

Preferably, the areas of the passages are greater by virtue of the increased length of the defining projections.

Alternatively, the areas of the passages are greater by virtue of the decreased width of the defining projections.

Alternatively, the areas of the passages are greater by virtue of the increased spacing between the defining projections.

Alternatively, the wall element comprises a base portion, the projections extend from the cooler side of the base portion, the base portion defines a raised section which is positioned adjacent the hot spot.

Alternatively, the wall element comprises a base portion, the projections extend from the cooler side of the base portion, the base portion defines a recessed section in the cooler side of the base portion.

Preferably, the second pattern comprises at least one divergent projection; the divergent projection is positioned between other projections in the second pattern to limit the amount of coolant flowing through an adjacent passage.

Preferably, a combustor wall structure of a gas turbine engine comprises inner and outer walls, wherein the inner wall includes at least one wall element according to any of the preceding paragraphs.

BRIEF DESCRIPTION OF THE DRAWINGS

Embodiments of the invention will now be described by way of example only, with reference to the accompanying diagrammatic drawings, in which:—

FIG. 2 is a sectional side view of part of a combustor of the engine shown in FIG. 1.

FIG. 3 is a diagrammatic sectional side view of part of a double-wall structure of a combustor.

FIG. 4 is a diagrammatic plan view of an outer surface of a first wall element according to the invention.

FIG. 5 is a diagrammatic plan view of part of an outer surface of a second wall element according to the invention.

FIG. 6 is a diagrammatic plan view of part of an outer surface of either the first or second wall elements and shows an alternative embodiment of either.

DETAILED DESCRIPTION OF THE INVENTION

Figure 1:
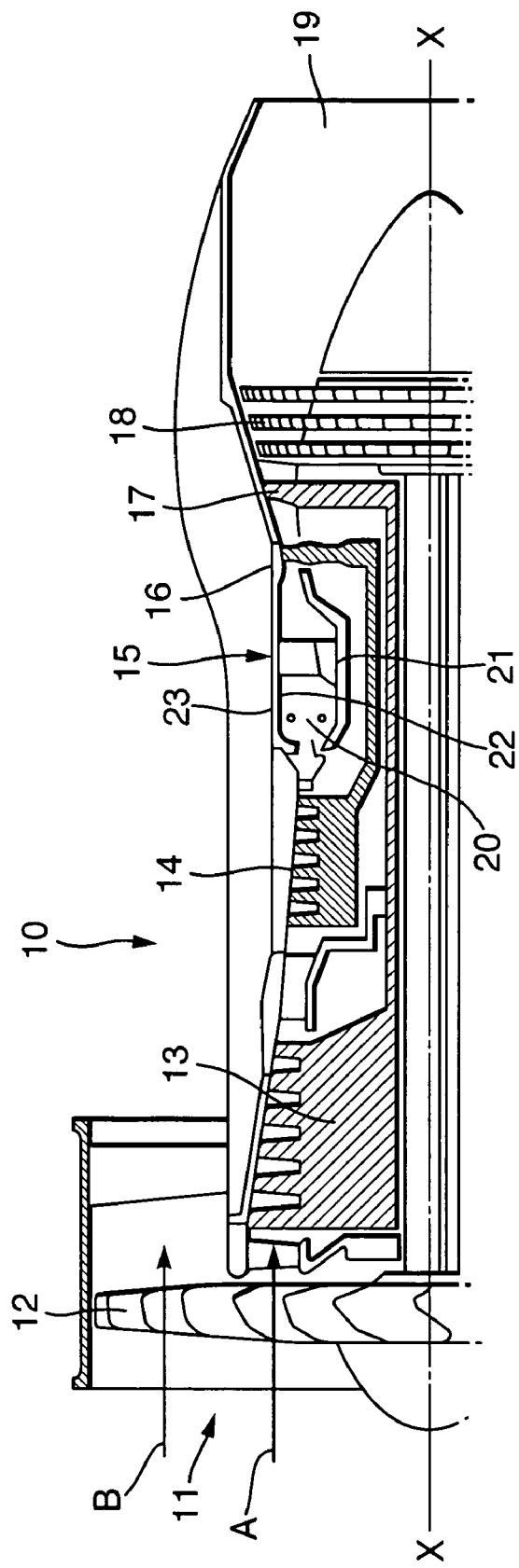
FIG. 1 is a sectional side view of a gas turbine engine.

With reference to FIG. 1, a gas turbine engine is generally indicated at 10 and comprises, in axial flow (arrow A) series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19. The engine has a rotational axis X-X.

The gas turbine engine 10 works in the conventional manner so that air entering the intake 11 is accelerated by the fan to produce two air flows: a first air flow A into the intermediate pressure compressor 13 and a second air flow B which provides propulsive thrust. The intermediate pressure compressor 13 compresses the air flow A directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

Referring to FIG. 2, the combustor 15 is constituted by an annular combustion chamber 20 having radially inner and outer double-wall structures 21 and 22 respectively. The combustor 15 is secured to a wall 23 by a plurality of pins 24 (only one of which is shown). Fuel is directed into the chamber 20 through a number of fuel nozzles 25 located at the upstream end 26 of the chamber 20. The fuel nozzles are circumferentially spaced around the engine 10 and serve to spray fuel into air (flow A) derived from the high pressure compressor 14. The resultant fuel/air mixture is then combusted within the chamber 20.

The combustion process, which takes place within the chamber 20, naturally generates a large amount of heat. It is necessary therefore to arrange the inner and outer wall structures 21 and 22 such that they are capable of withstanding the heat.

Referring now to FIG. 3, the radially inner and outer double-wall structures 21 and 22 each comprise an external wall in the form of a liner 27 and an internal wall 28. The terms 'internal' and 'external' are with respect to the combustion chamber 20. The internal wall 28 is made up of a plurality of discrete wall elements in the form of tiles 29A and 29B. Each of the tiles 29A, 29B has circumferentially extending edges 30 and 31, and the tiles are positioned adjacent each other, such that the edges 30 and 31 of adjacent tiles 29A, 29B overlap each other. Alternatively, the edges 30, 31 of adjacent tiles can abut each other.

Each tile 29A, 29B comprises a base portion 32 which is spaced from the liner 27 to define therebetween a space 38 for the flow of cooling fluid in the form of cooling air as will be explained below. Heat removal features in the form of projections or pedestals 40 are provided on the base portion 32 and extend into the space 38 towards the liner 27. Conventional securing means (not shown) in the form of a plurality of threaded plugs extend from the base portions 32 of the tiles 29A, 29B through apertures in the outer wall 27. Nuts are screwed onto the plugs to secure the tiles 29A, 29B to the external wall 27.

FIG. 3 shows part of one of the wall structures 21, 22 in more detail and illustrates the cooling airflow paths. Feed holes 42 are provided in the liner 27 to permit coolant air from the high pressure compressor 14 to pass into the space 38 as illustrated by the arrows 44. Coolant air 44 entering the space will pass forwards and backwards (with respect to the main airflow A through the engine) as illustrated by the arrows 46. In tile 29A, the backwards airflow (in respect to the main airflow shown by arrows A) passes over the outer cooler surface 41C and under the outer surface 81 of the liner 27, and then at the downstream edge 31 of the tile 29A (the downstream edge 31 is with respect to the coolant air flow shown by the arrow leaving tile 29A and flowing towards tile 29B), the coolant air leaves the tile 29A and passes over the inner hot surface 41H of adjacent tile 29B. For forward flowing air in tile 29B, as illustrated by the arrow 48, the coolant air will turn 180° to pass in a downstream direction with the coolant air from the adjacent upstream tile 29A to flow over the inner hot surface 41H of tile 29B.

FIG. 4 shows a 'hot-spot' 70 and how the temperature may vary over the inner hot surface 41H of tile 60B (similar to tile 29B) downstream of the injector 25. In this example, isothermal contours 71, 72, 73 are in increments of 20° C., but may be greater or less depending on engine cycle and combustor configuration. In a prior art tile the array of pedestals 40 are of uniform size and are arranged in a uniform pitch and spacing. Whilst the prior art tile 29A, 29B is sufficiently cooled below its melting point, there remains a significant thermal gradient across the tile due to the hot spot. During each flight cycle, the engine power demand changes and the amount of heat generated therefore also changes significantly, particularly at engine start up and run down. This leads to substantial thermal gradients across the tile and therefore differential thermal expansions and contractions and internal differential thermal stresses. Such differential thermal stresses cause thermal fatigue in the tile material and limits the service life of the tile.

Thus, the object of the present invention is to maintain a more constant temperature throughout and particularly across the surface of a tile and therefore reduce the thermal gradient and thereby increase the life of the tile. The present invention relates to arrangements of the tile such that additional film coolant is preferentially applied to the hot-spot 70 rather than the remainder of the tile.

FIG. 4 shows a first wall element or tile 60A, upstream of tile 60B, having two discrete regions of projections 40, a first conventional pattern 62 and a second pattern 64 in accordance with the present invention. The second pattern 64 is a means 64 to preferentially direct coolant flow at a hot-spot 70 on an adjacent, in this case downstream, tile 60B thereby reducing the thermal gradient across the tile 60B.

The first conventional pattern 62 is spaced from the downstream edge 31 of the tile 60A by the second pattern 64, which is adjacent to the edge 31. The first pattern 62 is a conventional staggered array of projections comprising rows of pedestals that are regularly spaced and pitched, each row evenly offset from the adjacent. This offset allows the coolant flow, passing around one row of projections, to impinge on the downstream and offset row of projections, maximizing heat transfer from the base portion 32 of the tile 60A.

The invention relates to the tile 60A comprising an array of angled and elongate pedestals 64, which is a means 64 to preferentially direct coolant flow at a hot-spot 70 on an adjacent, in this case downstream, tile 60B thereby reducing the thermal gradient across the tile 60B. Specifically, at least some of the projections in the second pattern 64 are angled towards the hot-spot 70. As can be seen in FIG. 4, at least two of the projections in the second pattern 64 are arranged at different angles. It should be appreciated that the number and precise angles of each projection will depend on exactly where the hot-spot is in relation to the second pattern and also its extent over the adjacent tile. The coolant flows over the outer cooler surface 41C of tile 60A, leaves the downstream edge 31 of tile 60A, and then contacts the inner hot surface 41H of tile 60B.

FIG. 5 shows a second wall tile 60C and an alternative arrangement of the second pattern 64. Here the second pattern 64 comprises elongate projections 64A that are curved and arranged to turn the cooling air towards the hot spot 70. The degree of curvature may be the same for each projection 64A or at least two projections may be arranged with different curvatures.

It should be appreciated that not only may the projections be curved as in the FIG. 5 embodiment, but they may also be angled as in described in the FIG. 4 embodiment, thereby optimizing directing of the coolant flow.

The FIGS. 4 and 5 embodiments are also beneficial in that the angle of the projections (64, 64A) or their curvature may be arranged such that the passageways (e.g. 61 on FIGS. 4 and 5) defined between adjacent projections 64, 64A are convergent. The convergent passageways 61 increase the amount of and the velocity of the cooling air C enabling the cooling film C to remain attached to the inner hot surface 41H of the downstream tile 60B over a longer distance and at least that of the hot spot 70.

Additional projections 64B may be used to distribute evenly the total coolant flowing through each passageway between projections. Alternatively, projections 64C increase in cross-section in the downstream direction, again so that the total coolant flowing through each passageway between projections is distributed evenly.

Alternatively, the passageways 61 may be arranged to provide a constant cross section to give a more even distribution of cooling air velocity across the tile.

Thus tile 60A or 60C in accordance with FIG. 4 or 5 or any combination thereof may be used upstream of a hot spot 70 in certain circumferential locations and the remainder of the circumferential locations, the tiles may be prior art tiles as described with reference to FIG. 3.

It should be appreciable to the skilled artisan that the embodiments of FIGS. 4 and 5 are capable of providing advantageous directional cooling flows to other features, such as a mixing chute or where a boss or a plug is attached to the opposite side of the tile 60B.

FIG. 6 shows the elongate pedestals 64, 64A comprising more aerodynamic leading and trailing tips 80, 82 so that the cooling air is less disturbed on entry to and exit from the array of elongate pedestals. The leading and trailing tips 80, 82 are circular in section, although other shapes are possible such as elliptical and pointed.

Figure 7:
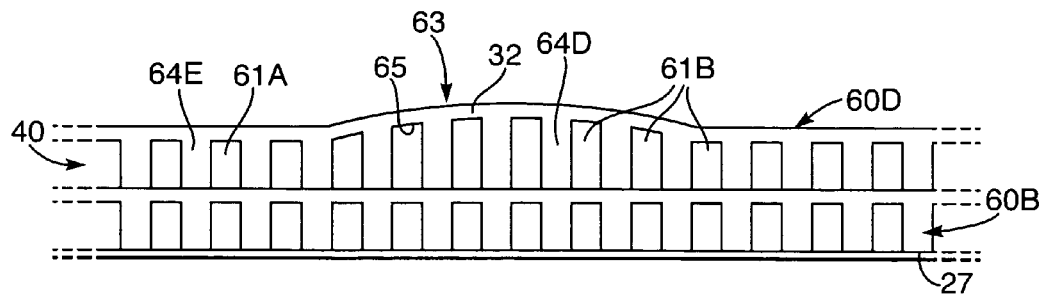
FIG. 7 is a view on section A-A of FIG. 3 and shows a third wall element according to the invention.

Referring now to FIG. 7, a third wall element 60D comprises a raised section 63 of the base portion 32, in this case a generally smooth bump at the downstream edge 31. The raised section 63 projects into the combustion chamber 20 relative to the remainder of the wall element 60D. The projections 64D extend from the cooler side 65 of the base portion 32. The raised section 63 is arranged upstream from the hot-spot 70 on the downstream tile 60B. The base portion 32 is of a generally constant thickness so that the projections 64D (second pattern) extending from the raised section 63 are longer than those projections 64E in the remainder of the wall element 60D. Noting in this exemplary embodiment that the all the projections 64D, 64E terminate and abut a flat surface of the downstream tile 60B. The projections 64D and 64E are substantially equally spaced. The passageways 61B, in the raised section 63, have a greater cross-sectional area than those passageways 61A in the remainder of the wall element 60D. Thus the greater cross-sectional area of the passageways 61B allow a greater and preferential amount of cooling flow over the otherwise hotter hot-spot region 70.

In this third wall element 60D the means to direct coolant flow at a hot-spot on an adjacent tile 60B is the arrangement of the raised section 63, longer projections 64D and increased cross-sectional area of the coolant passageways 61B.

Figure 8:
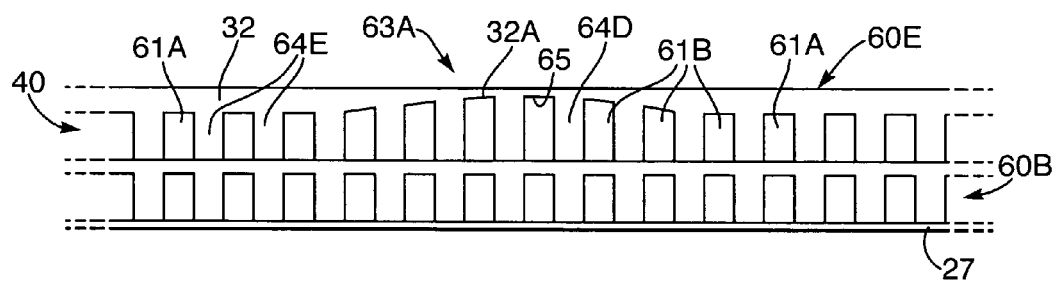
FIG. 8 is a view on section A-A of FIG. 3 and shows a fourth wall element according to the invention.

Referring now to FIG. 8, a fourth wall element 60E comprises a recessed section 63A of the base portion 32, in this case the recess 63A, in the outer surface of the cooler side of the base portion 32A, is generally smooth and terminates at the downstream edge 31. Similarly to the FIG. 7 embodiment the recessed section 63A is arranged upstream from the hot-spot 70 on the downstream tile 60B. As the base portion 32 varies in thickness the projections 64D (i.e. the second pattern) extending from the recessed section 63A are longer than those projections 64E in the remainder of the wall element 60E. Noting again that in this exemplary embodiment that the all the projections 64D, 64E terminate and abut a flat surface of the downstream tile 60B. The projections 64D and 64E are substantially equally spaced. The passageways 61B, in the recessed section 63A, have a greater cross-sectional area than those passageways 61A in the remainder of the wall element 60E. Thus the greater cross-sectional area of the passageways 61B allow a greater and preferential amount of cooling flow over what would otherwise be a hot-spot region 70.

Figure 9A:
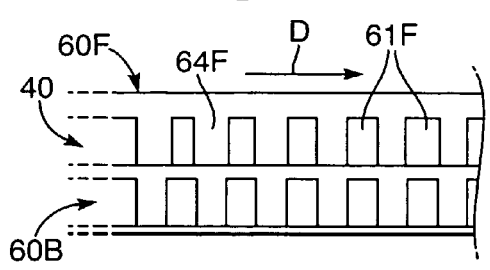
FIGS. 9A and 9B are part views on section A-A of FIG. 3 and show fifth and sixth wall elements according to the invention.
Figure 9B:
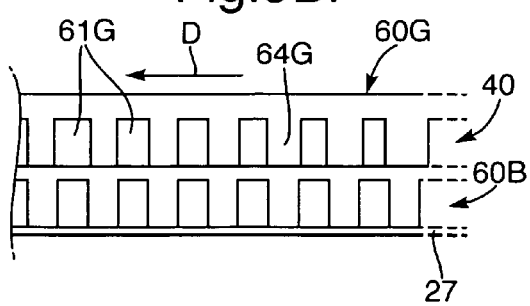

Referring to FIGS. 9A and 9B, showing fifth and sixth wall elements 60F and 60G, which each comprise a second pattern of projections 64F and 64G respectively. The second patterns 64F and 64G define passageways 61F and 61G respectively between corresponding projections. Here, the means to direct coolant flow at a hot-spot on an adjacent and usually downstream tile 60B is the arrangement of the spacing or the projections 64F or the width of the projections 64G which increase the width of the coolant passageways 61F and 61G in the direction of arrows D.

In FIG. 9A, the projections 64F are of constant width, but their spacing (centerline to centerline) increases in the direction of arrow D. In FIG. 9B, the width of the projections 64G decreases in the direction of arrow D. By way of comparison, note the constant width and spacing of the projections of the downstream tile 60B.

Although the means 64 to direct coolant flow preferably comprises elongate projections 40, a plurality of discrete projections 64' (see FIG. 6) aligned in close proximity to one another and angled or curved towards the hot-spot may also be used. This has the additional advantage of increasing the surface area for heat removal near to the edge 31 of the tile 60A-G. However, there may also be a reduction in the effectiveness of directing cooling air at the hot-spot as there may be some cross-flow (arrows E) between passageways, through the discrete projections 64'. Thus, it would be a matter of simple design choice and compromise between the better directing of coolant via elongate projections and more heat removal of a plurality of aligned projections for any given situation.

It should readily be understood by the skilled addressee that many combinations of the above exemplary embodiments may be made, but none depart from the scope of the present invention. For example, the embodiments of FIGS. 9A and 9B may be combined so that not only does the spacing between center-lines of the projections increase in the direction of arrow D, but also the width of the projections decrease. Another example is the combination of either or both FIG. 9A or 9B embodiments with either FIGS. 7 and 8 embodiments. Similarly, the FIGS. 4 and 5 embodiments may be combined with any one or more of the embodiments of FIG. 7, 8, 9A or 9B. The object of the present invention is to provide a combustor wall element having a plurality of projections 40, which not only facilitate heat transfer to a coolant flowing therethrough, but is also arranged to direct more of that coolant flow, as film cooling, at a hot-spot on an adjacent tile 60B than the remainder of the tile and thereby reduce the thermal gradient across that tile.

Although each embodiment or combination of embodiments are shown as being configured symmetrically and that the greatest amount of cooling flow is generally in the center of the second pattern, asymmetric and offset configurations are also within the scope of the present invention. The asymmetry or offset arrangements would be appropriate where there would otherwise be an asymmetric or offset hot-spot.

We claim:

1. A wall element of a gas turbine engine combustor, the wall element comprising:
an inner, in use, hot surface;
an outer, in use, cooler surface, with respect to the gas turbine engine combustor, wherein the wall structure having a downstream edge such that a coolant flow over the outer cooler, in use, surface exits the wall element at the downstream edge; and
a plurality of projections being provided on the outer surface to facilitate heat transfer to the coolant flow during use, wherein a portion of said plurality of projections being constructed and arranged to direct more coolant flow leaving the downstream edge at a hot-spot on an adjacent tile during use than the remainder of the adjacent tile to reduce the thermal gradient across the adjacent tile, and wherein said plurality of projections are arranged in a first pattern and a second pattern, said first pattern comprising a staggered array of projections and said second pattern comprising said portion of said plurality of projections, and wherein at least some of the projections in the second pattern comprise a plurality of discrete pedestals, and wherein a space between adjacent pedestals, within the plurality of discrete pedestals, is less than the corresponding dimension of either adjacent pedestal.

2. A wall element according to claim 1, wherein the wall element comprises a base portion, the projections extend from the cooler side of the base portion, the base portion defines a raised section which is positioned adjacent the hot spot.

3. A wall element according to claim 1, wherein the wall element comprises a base portion, the projections extend from the cooler side of the base portion, the base portion defines a recessed section in the cooler side of the base portion.

4. A combustor wall structure of a gas turbine engine, the wall structure comprising inner and outer walls, wherein the inner wall includes at least one wall element according to claim 1.

5. A wall element of a gas turbine engine combustor, the wall element comprising:
an inner, in use, hot surface;
an outer, in use, cooler surface, with respect to the gas turbine engine combustor; and
a plurality of projections being provided on the outer surface to facilitate heat transfer to a coolant flow during use, wherein a portion of said plurality of projections being constructed and arranged to direct more coolant flow at a hot-spot on an adjacent tile during use than the remainder of the adjacent tile to reduce the thermal gradient across the adjacent tile, wherein the plurality of projections are arranged in a first pattern and a second pattern, the first pattern comprising a staggered array of projections and the second pattern comprising said portion of said plurality of projections, and at least some of the projections in the second pattern are elongate with respect to the direction of cooling flow.

6. A wall element according to claim 5, wherein the elongate projections comprise a leading tip and a trailing tip, at least one of the tips having an aerodynamic profile.

7. A wall element according to claim 5, wherein at least two of the projections in the second pattern are arranged at different angles.

8. A wall element of a gas turbine engine combustor, the wall element comprising:
an inner, in use, hot surface;
an outer, in use, cooler surface, with respect to the gas turbine engine combustor; and
a plurality of projections being provided on the outer surface to facilitate heat transfer to a coolant flow during use, wherein a portion of said plurality of projections being constructed and arranged to direct more coolant flow at a hot-spot on an adjacent tile during use than the remainder of the adjacent tile to reduce the thermal gradient across the adjacent tile, wherein the plurality of projections are arranged in a first pattern and a second pattern, the first pattern comprising a staggered array of projections and the second pattern comprising said portion of said plurality of projections, and the projections in the second pattern are angled towards the hot-spot.

9. A wall element of a gas turbine engine combustor, the wall element comprising:
an inner, in use, hot surface;
an outer, in use, cooler surface, with respect to the gas turbine engine combustor, wherein the wall structure having a downstream edge such that a coolant flow over the outer cooler, in use, surface exits the wall element at the downstream edge; and
a plurality of projections being provided on the outer surface to facilitate heat transfer to the coolant flow during use, wherein a portion of said plurality of projections being constructed and arranged to direct more coolant flow leaving the downstream edge at a hot-spot on an adjacent tile during use than the remainder of the adjacent tile to reduce the thermal gradient across the adjacent tile, and wherein said plurality of projections are arranged in a first pattern and a second pattern, said first pattern comprising a staggered array of projections and said second pattern comprising said portion of said plurality of projections, and wherein the projections in the second pattern are curved and turn the cooling flow towards the hot-spot.

10. A wall element according to claim 9, wherein at least two of the projections in the second pattern are arranged with different curvatures.

11. A wall element of a gas turbine engine combustor, the wall element comprising:
an inner, in use, hot surface;
an outer, in use, cooler surface, with respect to the gas turbine engine combustor, wherein the wall structure having a downstream edge such that a coolant flow over the outer cooler, in use, surface exits the wall element at the downstream edge; and a plurality of projections being provided on the outer surface to facilitate heat transfer to the coolant flow during use, wherein a portion of said plurality of projections being constructed and arranged to direct more coolant flow leaving the downstream edge at a hot-spot on an adjacent tile during use than the remainder of the adjacent tile to reduce the thermal gradient across the adjacent tile, and wherein said plurality of projections are arranged in a first pattern and a second pattern, said first pattern comprising a staggered array of projections and said second pattern comprising said portion of said plurality of projections, and wherein passages, defined between projections, adjacent the hot spot have greater cross-sectional areas than those not adjacent the hot spot.

12. A wall element according to claim 11, wherein the areas of the passages are greater by virtue of the increased length of the defining projections.

13. A wall element according to claim 11, wherein the areas of the passages are greater by virtue of the decreased width of the defining projections.

14. A wall element according to claim 11, wherein the areas of the passages are greater by virtue of the increased spacing between the defining projections.

15. A wall element of a gas turbine engine combustor, the wall element comprising:

an inner, in use, hot surface;

an outer, in use, cooler surface, with respect to the gas turbine engine combustor, wherein the wall structure having a downstream edge such that a coolant flow over the outer cooler, in use, surface exits the wall element at the downstream edge; and a plurality of projections being provided on the outer surface to facilitate heat transfer to the coolant flow during use, wherein a portion of said plurality of projections being constructed and arranged to direct more coolant flow leaving the downstream edge at a hot-spot on an adjacent tile during use than the remainder of the adjacent tile to reduce the thermal gradient across the adjacent tile, and wherein said plurality of projections are arranged in a first pattern and a second pattern, said first pattern comprising a staggered array of projections and said second pattern comprising said portion of said plurality of projections, and wherein the second pattern comprises at least one divergent projection, the divergent projection is positioned between other projections in the second pattern to limit the amount of coolant flowing through an adjacent passage.

* * * * *